US012609248B2

(12) United States Patent
Lin et al.

(10) Patent No.: US 12,609,248 B2
(45) Date of Patent: Apr. 21, 2026

(54) CONDUCTIVE PASTE, MANUFACTURING METHOD THEREOF, CAPACITOR ELEMENT AND MANUFACTURING METHOD THEREOF

(71) Applicant: APAQ TECHNOLOGY CO., LTD., Miaoli County (TW)

(72) Inventors: Ching Feng Lin, Miaoli County (TW); Chieh Lin, Miaoli County (TW); Shang-Che Lan, Miaoli County (TW); Shuo Yan Ma, Miaoli County (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 384 days.

(21) Appl. No.: 18/448,175

(22) Filed: Aug. 11, 2023

(65) Prior Publication Data

US 2024/0266119 A1 Aug. 8, 2024

(30) Foreign Application Priority Data

Feb. 3, 2023 (TW) ................................. 112103780

(51) Int. Cl.
| | |
|---|---|
| *H01G 9/025* | (2006.01) |
| *C09D 5/24* | (2006.01) |
| *C09D 7/40* | (2018.01) |
| *C09D 7/65* | (2018.01) |
| *C09D 163/00* | (2006.01) |
| *H01G 9/00* | (2006.01) |

(52) U.S. Cl.
CPC .............. *H01G 9/025* (2013.01); *C09D 5/24* (2013.01); *C09D 7/65* (2018.01); *C09D 7/69* (2018.01); *C09D 163/00* (2013.01); *H01G 9/0036* (2013.01)

(58) Field of Classification Search
None
See application file for complete search history.

(56) References Cited

U.S. PATENT DOCUMENTS

| | | | | |
|---|---|---|---|---|
| 10,755,864 B2 * | 8/2020 | Chacko | ................ | H01G 9/0425 |
| 2005/0219802 A1 * | 10/2005 | Kobayashi | ........... | H01G 9/0032 |
| | | | | 361/523 |
| 2009/0195968 A1 * | 8/2009 | Naito | ........................ | H01B 1/22 |
| | | | | 252/62.2 |
| 2018/0122581 A1 * | 5/2018 | Sato | ........................ | H01G 9/028 |
| 2020/0087150 A1 * | 3/2020 | Wunch | .................... | C08L 75/00 |
| 2023/0043077 A1 * | 2/2023 | Tanaka | .................... | H01G 9/052 |

(Continued)

FOREIGN PATENT DOCUMENTS

| | | | | |
|---|---|---|---|---|
| CN | 101151691 B | * | 11/2010 | ............. H01G 9/045 |
| TW | 200914534 A | | 4/2009 | |
| TW | 201928995 A | | 7/2019 | |

OTHER PUBLICATIONS

Translation of CN '691 (Year: 2010).*

*Primary Examiner* — Dion R. Ferguson

(74) *Attorney, Agent, or Firm* — CKC & Partners Co., LLC

(57) ABSTRACT

A conductive paste, a manufacturing method of a conductive paste, a capacitor element and a manufacturing method of a capacitor element are provided. The conductive paste includes a conductive composite material powder and a resin. The conductive composite material powder is obtained by grinding a conductive composite material in a solid state. The resin is mixed with the conductive composite material powder.

13 Claims, 6 Drawing Sheets

100

110   120

(56)                    References Cited

U.S. PATENT DOCUMENTS

| 2023/0117353 A1* | 4/2023 | Mano | .................... | H01G 9/048 |
| | | | | 361/523 |
| 2024/0266119 A1* | 8/2024 | Lin | ......................... | C09D 5/24 |
| 2024/0355554 A1* | 10/2024 | Morita | .................... | H01G 9/15 |

* cited by examiner

100

110   120

200

210 a polymerization step is performed 220 a grinding step is performed 230 a glue compounding step is performed

CONDUCTIVE PASTE, MANUFACTURING METHOD THEREOF, CAPACITOR ELEMENT AND MANUFACTURING METHOD THEREOF

RELATED APPLICATIONS

This application claims priority to Taiwan application Ser. No. 11/210,3780, filed Feb. 3, 2023, which is herein incorporated by reference.

BACKGROUND

Technical Field

The present disclosure relates to a conductive paste, a manufacturing method thereof, a capacitor element and a manufacturing method thereof. More particularly, the present disclosure relates to a conductive paste which can improve the leakage or short circuit problem of the capacitor, a manufacturing method thereof, a capacitor element and a manufacturing method thereof.

Description of Related Art

The capacitor has been widely used in the basic components, such as the consumer home appliances, the computer mainboard and the merchandise thereof, the power supply unit, the communication product, and the automobile etc., wherein the main functions thereof include: filtering, bypassing, rectifying, coupling, decoupling and phase translating, so that the capacitor is one of the indispensable component in the electronic product. Among them, the solid electrolytic capacitor has the advantages of the small size, the large capacitance and the superior frequency characteristics, and can be widely used. The solid electrolytic capacitor uses the solid electrolyte to replace the liquid electrolyte as the cathode, and the conductive polymer has been widely used as the cathode material for the solid electrolytic capacitor due to the advantage of the high conductivity and the easy acquisition.

However, the current technology requires to be combined with multiple impregnations and multiple cycles to form the polymers, and the operation is very complicated. In addition, during the formation of the conductive polymer layer, a large number of holes will be formed on its surface, and the holes may easily lead to the problem of leakage or short circuit of the capacitor. Furthermore, the film-forming property of the conductive polymer layer is poor, the thickness and the uniformity are difficult to control, which affect the flatness and the stackability of the entire capacitor element, and is unfavorable for the subsequent processing.

Therefore, how to improve the above-mentioned problems is the goal of the relevant industry.

SUMMARY

According to one aspect of the present disclosure, a conductive paste includes a conductive composite material powder and a resin. The conductive composite material powder is obtained by grinding a conductive composite material in a solid state. The resin is mixed with the conductive composite material powder.

According to another aspect of the present disclosure, a manufacturing method of a conductive paste is used to manufacture the conductive paste according to the foregoing aspect, and includes steps as follows. A polymerization step is performed, wherein a conductive polymer, an oxidizing agent and an inhibitor are mixed and chemically polymerized to form the conductive composite material. A grinding step is performed, wherein the conductive composite material is grinded after drying to obtain the conductive composite material powder. A glue compounding step is performed, wherein the conductive composite material powder is mixed with the resin to obtain the conductive paste.

According to further another aspect of the present disclosure, a capacitor element includes a metal foil, a conductive layer and a silver glue layer. A surface of the metal foil has an oxide layer. The conductive layer is connected to the oxide layer of the metal foil, and the conductive layer includes a conductive polymer layer and the conductive paste according to the foregoing aspect. The conductive polymer layer is polymerized on the oxide layer of the metal foil. The conductive paste is coated on a surface of the conductive polymer layer away from the oxide layer. The silver glue layer is connected to a surface of the conductive paste away from the conductive polymer layer.

According to yet another aspect of the present disclosure, a manufacturing method of a capacitor element includes steps as follows. A metal foil is provided, wherein a surface of the metal foil has an oxide layer. A conductive polymer layer is polymerized on the oxide layer of the metal foil. The conductive paste according to the foregoing aspect is connected to a surface of the conductive polymer layer away from the oxide layer by a coating method. A silver glue layer is connected to a surface of the conductive paste away from the conductive polymer layer.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
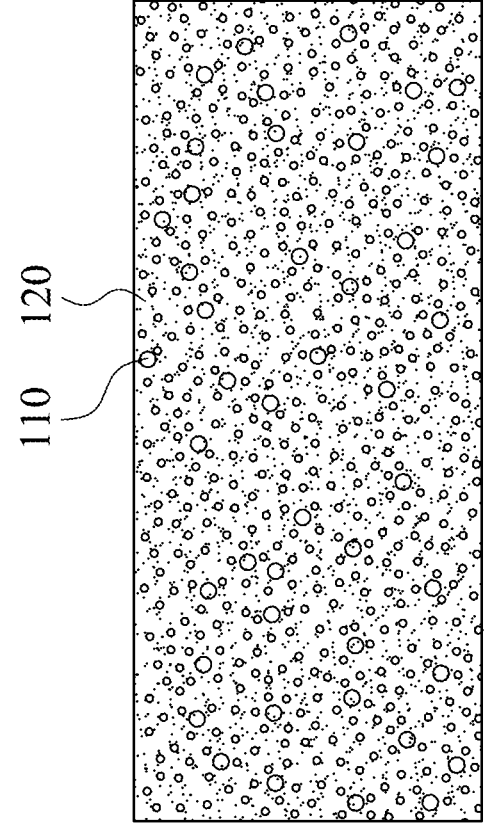
FIG. 1 is a schematic diagram of a conductive paste according to one embodiment of the present disclosure.

The embodiments of the present disclosure will be described below by referring the figures. For the clarity, many practical details will be explained in the following description. However, the readers should realize that these practical details are not limited to the present disclosure. That is, in some embodiments of the present disclosure, the practical details are not necessary. In addition, in order to simplify the figures, some of the conventional structures and elements will be shown in the figures with simplified schematic; and the repeated elements will be shown by the same reference numerals.

Reference is made to FIG. 1, which is a schematic diagram of a conductive paste 100 according to one embodiment of the present disclosure. The conductive paste 100 of the present disclosure includes a conductive composite material powder 110 and a resin 120. The conductive composite material powder 110 is mixed with the resin 120, and is uniformly dispersed in the resin 120. Furthermore, the conductive composite material powder 110 is obtained by grinding a conductive composite material in a solid state. The conductive paste 100 of the present disclosure is a sol formed by mixing the liquid in the continuous phase and the solid in the dispersed phase, and the solid is uniformly dispersed and mixed in the continuous phase liquid to achieve the stable characteristic.

Figure 3:
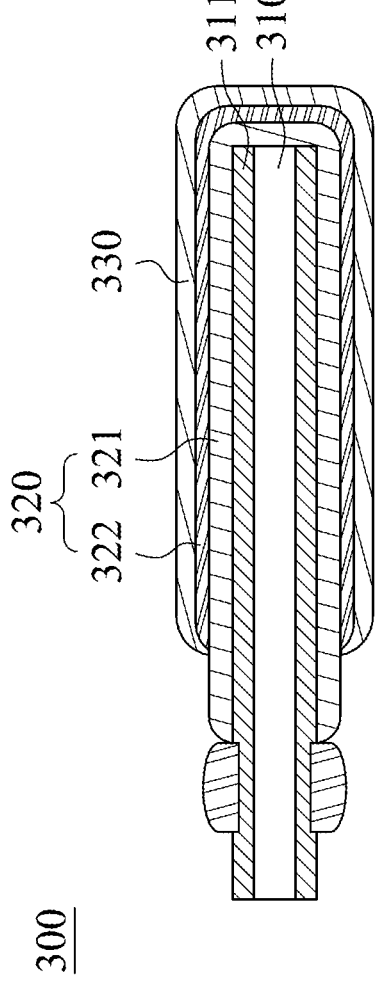
FIG. 3 is a cross-sectional view diagram of a capacitor element according to further another embodiment of the present disclosure.

Specifically, the conductive paste 100 of the present disclosure can be applied to a capacitor element (as shown in FIG. 3). The conductive paste 100 of the present disclosure has the advantages of high compactness, high thixotropic index, high viscosity, high solid content, better film-forming property and good conductivity, etc., which can effectively improve the problems of leakage and poor cladding of the capacitor. The conductive paste 100 of the present disclosure has the effects of suppressing leakage, increasing cladding, protecting the conductive polymer layer of the capacitor, providing the characteristics of the transmission capacitor, and providing the barrier layer.

In detail, the conductive composite material can be a poly(3,4-ethylenedioxythiophene)-poly(styrenesulfonate) complex (PEDOT:PSS), a complex of a poly(3,4-ethylenedioxythiophene)-poly(styrenesulfonate) and an organic ionic plastic crystal (PEDOT:PSS/OIPC), a complex of a poly(3,4-ethylenedioxythiophene)-poly(styrenesulfonate) and a reduced graphene oxide (RGO/PEDOT:PSS) or a complex of a poly(3,4-ethylenedioxythiophene)-poly(styrenesulfonate) and a reduced graphene oxide with a nickel oxide (RGO/PEDOT:PSS/NiO), but the present disclosure is not limited thereto.

The resin 120 can be polyester, epoxy resin, vinyl ester, phenolic resin, poly(methyl methacrylate) (PMMA) or polyurethane (PU), but the present disclosure is not limited thereto.

Before grinding, the bulk material impedance of the dry conductive composite material can be $0.1\Omega$ to $1\ K\Omega$, and the bulk material conductivity of the conductive composite material can be $1\times10^{-2}\Omega/\square$ to $9\times10^{6}\Omega/\square$ (ohm/square). Therefore, the better capacitor function can be achieved.

Based on the conductive paste 100 is 100 wt %, the conductive composite material powder 110 can be 15 wt % to 40 wt %, and a particle size of the conductive composite material powder 110 can be 2 μm to 600 μm. Further, the conductive composite material powder 110 can be formed by mixing the particles of more than two particle sizes to achieve the better physical property. In detail, the conductive composite material powder 110 can have a first particle size and a second particle size. The first particle size can be 48 μm to 100 μm, and the second particle size can be 18 μm to 38 μm. Therefore, the compactness of the conductive paste 100 can be improved.

By the adjustment of abovementioned parameters, the physical characteristic of the conductive paste 100 of the present disclosure can be improved. The thixotropic index (TI value) of the conductive paste 100 can be 0.1 to 1.0. The viscosity operating range of the conductive paste 100 is 500 cps to 10000 cps. The gel viscosity of the conductive paste 100 is 50000 cps to 60000 cps. The solid content of the conductive paste 100 can be 20% to 50%. The interface impedance of the conductive paste 100 is $10\Omega$ to $10\ K\Omega$.

The sheet conductivity of the conductive paste 100 is $1\times10^{1}\Omega/\square$ to $1\times10^{4}\Omega/\square$ (ohm/square). Therefore, it can ensure that the conductive paste 100 is not easy to fall off, and can effectively improve the problems of leakage and poor cladding of the capacitor.

Figure 2:
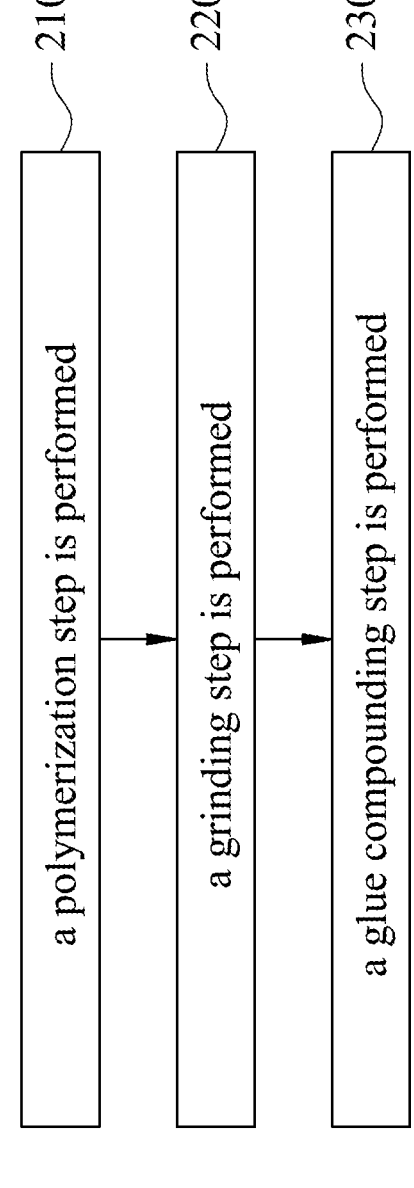
FIG. 2 is a flow chart of a manufacturing method of a conductive paste according to another embodiment of the present disclosure.

Reference is made to FIG. 2, which is a flow chart of a manufacturing method of a conductive paste 200 according to another embodiment of the present disclosure. The manufacturing method of the conductive paste 200 of FIG. 2 can be used to manufacture the conductive paste 100 of FIG. 1, and the manufacturing method of the conductive paste 200 includes a step 210, a step 220 and a step 230.

In the step 210, a polymerization step is performed, wherein a conductive polymer, an oxidizing agent and an inhibitor are mixed and chemically polymerized to form the conductive composite material.

In detail, in the polymerization step, the oxidizing agent and the inhibitor are uniformly mixed according to the specific proportion, and the conductive polymer is added to prepare a mixed solution. Next, the mixed solution is placed in the oven for chemical polymerization, wherein the temperature of the oven can be 40° C. to 220° C., the placement time can be 5 hours, and a solution containing the conductive composite material is obtained. Further, a drying step is performed, wherein the conductive composite material is cleaned by the alcohol for 3 times to 5 times, and then placed in the oven to dry, wherein the temperature of the oven can be 125° C. Then, the conductive composite material that is dried and is solid electrolyte can be obtained.

Specifically, in the polymerization step, a molar ratio of the conductive polymer and the oxidizing agent can be 0.5:1 to 10:1, and a molar ratio of the oxidizing agent and the inhibitor can be 1:0.1 to 1:5.

The conductive polymer can be a heterocyclic compound, a benzene ring compound, an aromatic ring compound or an amine compound. Further, the conductive polymer can be polypyrrole, polythiophene or polyaniline.

The inhibitor can be a ring aromatic organic compound, an amine or a polyol. The ring aromatic organic compound can be but not limited to imidazole, the amine can be but not limited to dimethylethanolamine or primary amine organic compound, the polyol can be but not limited to glycerin or sorbitol.

The oxidizing agent can be a metal salt, a p-toluenesulfonate iron, a p-toluenesulfonic acid, an alkali metal, an alkaline earth metal, a metal oxide, a hydrogen peroxide, a nitric acid or a peroxyorganic acid.

Furthermore, the dopant can be further added in the polymerization step to perform the chemical polymerization. The effect of the dopant is for dispersion, surface modification, conductivity adjustment and interfacial activity adjustment in the solid state or during synthesis. The dopant can be a sulfate, a polyol, a carbon material, a ferric perchlorate, a semi-crystalline polymer, a metal compound, an ionic surfactant or a carboxyl compound. The sulfate can be but not limited to polystyrene sulfonate (PSS) or sulfuric acid. The polyol can be but not limited to glycerin or sorbitol. The carbon material can be but not limited to nanotube or graphene. The semi-crystalline polymer can be but not limited to polycaprolactone. The metal compound can be but not limited to molybdenum dioxide. The ionic surfactant can be but not limited to dodecylbenzenesulphonic acid (DBSA), bis(2-ethylhexyl)sulfosuccinate sodium salt (NaDEHS) or poly(2-acrylamido-2-methyl-1-propanesulfonic acid) (PAMPS). The carboxyl compound can be but not limited to oxalic acid, malonic acid, succinic acid, pentanedioic acid, hexanedioic acid, heptanedioic acid, octanedioic acid, azelaic acid, sebacic acid, dodecanedioic acid, phthalic acid, maleic acid, muconic acid, citric acid, trimesic acid or polyacrylic acid.

In the step 220, a grinding step is performed, wherein the conductive composite material is grinded after drying to obtain the conductive composite material powder. The conductive composite material can be sieved after grinding to control the particle size of the conductive composite material powder, wherein the particle size of the conductive composite material powder can be 2 μm to 600 μm.

In the step 230, a glue compounding step is performed, wherein the conductive composite material powder is mixed with the resin to obtain the conductive paste. Based on the conductive paste is 100 wt %, the conductive composite material powder can be 15 wt % to 40 wt %.

Reference is made to FIG. 3, which is a cross-sectional view diagram of a capacitor element 300 according to further another embodiment of the present disclosure. The capacitor element 300 includes a metal foil 310, a conductive layer 320 and a silver glue layer 330. A surface of the metal foil 310 has an oxide layer 311. The conductive layer 320 includes a conductive polymer layer 321 and a conductive paste 322, wherein the conductive paste 322 exists in the form of a solid electrolyte of an electrolysis layer. It is particularly noted that the conductive paste 322 of FIG. 3 is the same as the conductive paste 100 of FIG. 1, and the technical details can refer to the aforementioned paragraph of FIG. 1, and will not be described herein.

Specifically, according to the different usage requirements, the metal foil 310 can be aluminum, copper or other metals. The conductive layer 320 is connected to the oxide layer 311, wherein the conductive polymer layer 321 is polymerized on the oxide layer 311 of the metal foil 310. The conductive paste 322 is coated on a surface of the conductive polymer layer 321 away from the oxide layer 311. The silver glue layer 330 is connected to a surface of the conductive paste 322 away from the conductive polymer layer 321, wherein the thickness of the conductive paste 322 can be 5 μm to 30 μm. It can be known from FIG. 3, the conductive polymer layer 321 surrounds and clads the oxide layer 311, the conductive paste 322 surrounds and completely clads the conductive polymer layer 321, and the silver glue layer 330 surrounds and completely clads the conductive paste 322. In brief, the capacitor element 300 is respectively arranged in sequence from the inside to the outside is the metal foil 310, the conductive polymer layer 321, the conductive paste 322 and the silver glue layer 330.

Particularly, by the setting of the conductive paste 322, the holes on the surface of the conductive polymer layer 321 can be filled, so as to increase the flatness of the surface of the conductive polymer layer 321, and clad effectively the conductive polymer layer 321 to achieve the effect of the surface modification. Therefore, the compactness, the flatness, the mechanical strength, the thermal stability and the moisture sensitivity of the conductive layer 320 can be improved effectively, so as to increase the interface transmission path and reduce the impedance to achieve the function of the capacitor. It can effectively reduce the risk of the leakage or the short circuit caused by the silver glue layer 330 directly contacting the metal foil 310.

Figure 4:
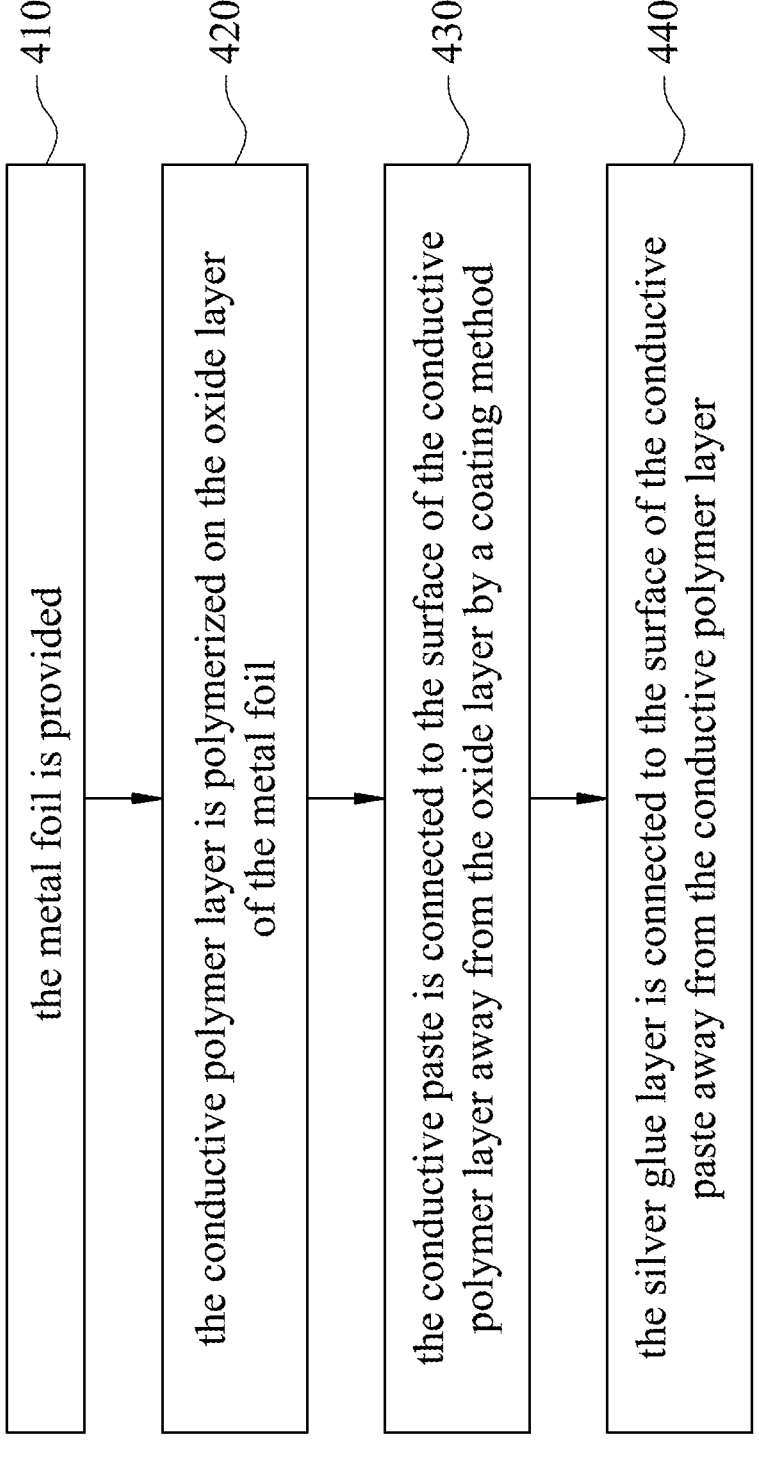
FIG. 4 is a flow chart of a manufacturing method of a capacitor element according to yet another embodiment of the present disclosure.

Reference is made to FIG. 4, which is a flow chart of a manufacturing method of a capacitor element 400 according to yet another embodiment of the present disclosure. The manufacturing method of the capacitor element 400 includes a step 410, a step 420, a step 430 and a step 440. The following will take the manufacturing of the capacitor element 300 of the embodiment shown in FIG. 3 as an example for illustration.

In the step 410, the metal foil 310 is provided, wherein the surface of the metal foil 310 has the oxide layer 311. In the step 420, the conductive polymer layer 321 is polymerized on the oxide layer 311 of the metal foil 310. In the step 430, the conductive paste 322 is connected to the surface of the conductive polymer layer 321 away from the oxide layer 311 by a coating method. In the step 440, the silver glue layer 330 is connected to the surface of the conductive paste 322 away from the conductive polymer layer 321.

Particularly, by the special physical property of the conductive paste 322 of the present disclosure, such as high thixotropic index, high viscosity, high solid content, better film-forming property, etc., so as to be processed by the coating method. The coating method can be dipping, coating, roll to roll, screen printing, spray coating, stencil printing, wire bar coating or roll coating (such as wheel ink printing, transfer printing) and other methods. Therefore, the conductive paste 322 of the present disclosure can be coated in various methods, which can reduce the impregnation times of the conductive layer 320, and can effectively improve the efficiency of the manufacturing method of the capacitor element 400.

In detail, the manufacturing process of the general capacitor is by multiple impregnations with chemical in-situ polymerization, multiple impregnations with pre-synthesized polymer slurry or multiple impregnations with electro-polymerization to complete the coating of the conductive layer, and the above methods need to go through multiple times of soaking and baking, which is very time-consuming and complicated. In particular, the conductive paste 322 of the present disclosure is polymerized first, then configured into the colloid, and then coated. Therefore, it is helpful to replace or reduce the cyclic operation of impregnation forming of the conductive layer, so as to improve the efficiency of the manufacturing method of the capacitor element 400.

Moreover, by the operation of the special physical characteristic and the coating method of the conductive paste 322, the controllability of the conductive layer 320 can be further improved, and the thickness, the uniformity and the coating position of the conductive layer 320 can be accurately controlled. Further, the covering property of the corners can also be ensured. Therefore, the manufacturing method of the capacitor element 400 can achieve the more precise structural requirement.

<Leakage Test>

Figure 5:
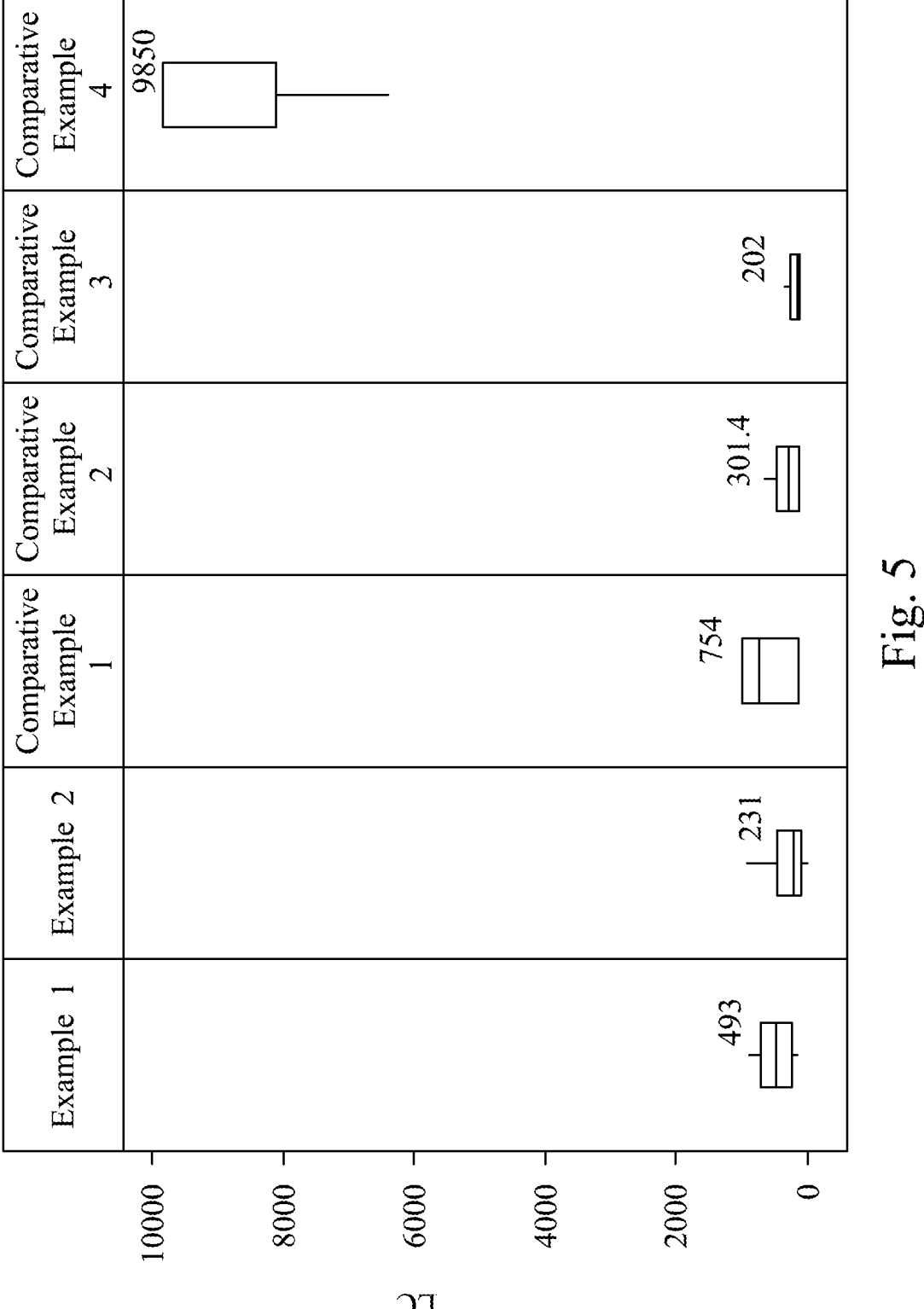
FIG. 5 is a result of the anti-leakage effect of Example and Comparative Example of the present disclosure.
Figure 6:
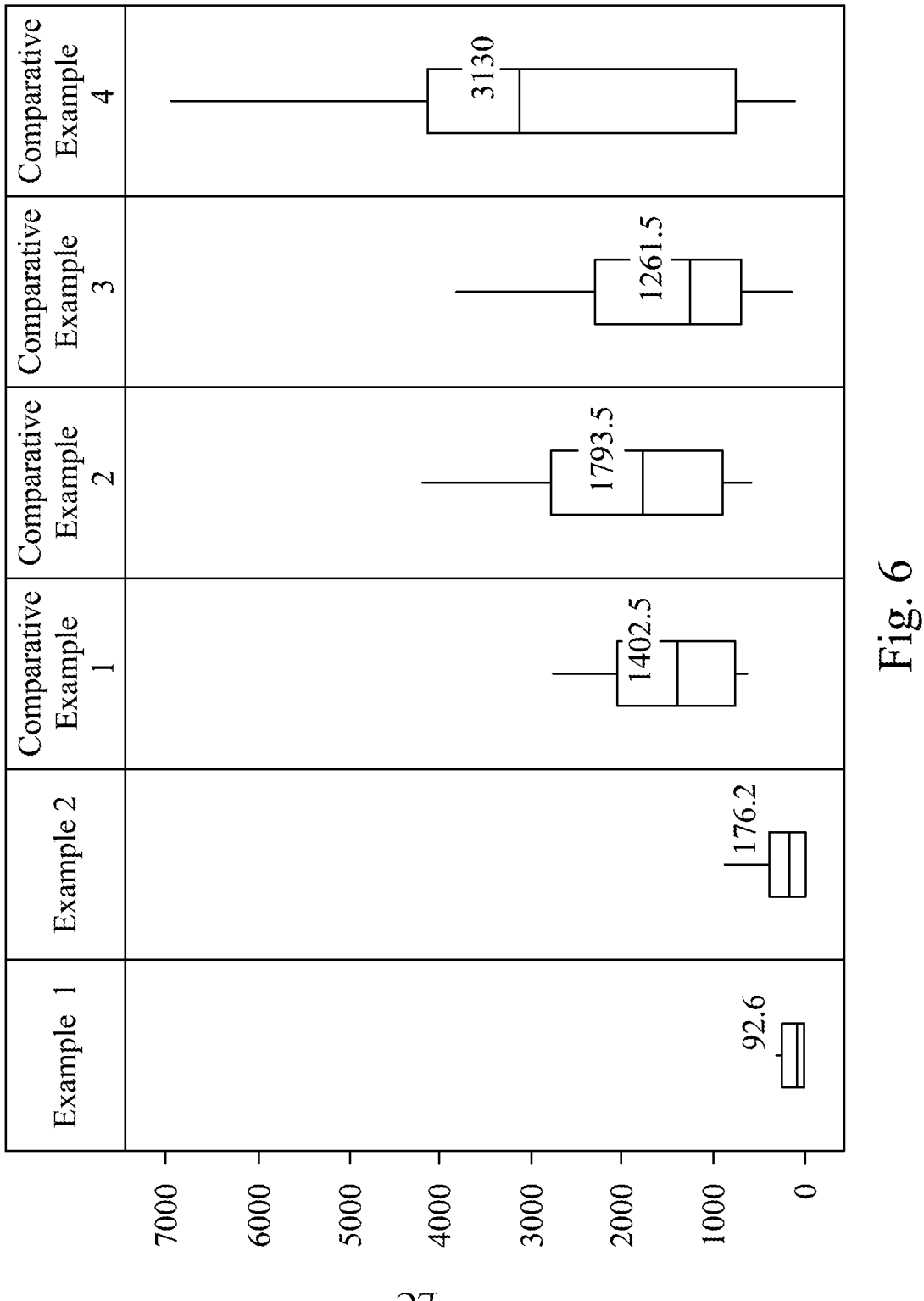
FIG. 6 is another result of the anti-leakage effect of Example and Comparative Example of the present disclosure.

Reference is made to FIG. 5 and FIG. 6, wherein FIG. 5 is a result of the anti-leakage effect of Example and Comparative Example of the present disclosure. FIG. 6 is another result of the anti-leakage effect of Example and Comparative Example of the present disclosure. In order to further illustrate the effect of the conductive paste of the present disclosure, Example 1 to Example 2 and Comparative Example 1 to Comparative Example 4 are proposed, and the leakage conditions thereof are observed.

In detail, Example 1 and Example 2 is the conductive paste of the present disclosure (hereafter referred as Example 1 and Example 2). The conductive composite material of Example 1 and Example 2 is PEDOT:PSS complex, the resin of the Example 1 and Example 2 is epoxy resin. Example 1 and Example 2 are equipped with the conductive composite material powders of different particle sizes, respectively, and Example 1 and Example 2 do not contain the carbon powder. The particle size of the conductive composite material powder of Example 1 is 400 μm to 600 μm, and the particle size of the conductive composite material powder of Example 2 is 200 μm to 400 μm.

Comparative Example 1, Comparative Example 2 and Comparative Example 3 is the colloid which doped the carbon powder and different ratio of the conductive composite material powder, and Comparative Example 4 is the commercially carbon glue. In detail, the amount of the carbon powder of Comparative Example 1, Comparative Example 2 and Comparative Example 3 is 90 wt %, and Comparative Example 4 is the full carbon powder. Furthermore, the particle size of the conductive composite material powder of Comparative Example 1 and Comparative Example 2 is 400 μm to 600 μm, and the particle size of the conductive composite material powder of Comparative Example 3 is 200 μm to 400 μm, wherein Comparative Example 1 and Comparative Example 2 are reproducibility test.

Specifically, in the test of FIG. 5, Example 1 to Example 2 and Comparative Example 1 to Comparative Example 4 are directly coated on the surface of the metal foil, respectively. As shown in FIG. 5, the leakage current (LC) value of Example 1 and Example 2 of the present disclosure can reach the effect below 1000 μA.

Furthermore, in the test of FIG. 6, the conductive polymer layer is first coated on the surface of the metal foil, and then Example 1 to Example 2 and Comparative Example 1 to Comparative Example 4 are coated on the surface of the conductive polymer layer, respectively. As shown in FIG. 6, the leakage current (LC) value of Example 1 and Example 2 of the present disclosure can reach the effect below 1000 μA. Moreover, the performance of Comparative Example 1 to Comparative Example 4 is significantly worse than that of Example 1 to Example 2, which is presumed that there is the stacking effect between the conductive composite material powder and the carbon powder during the mixing process. It can be known that the conductive paste of the present disclosure can replace the carbon paste layer, so as to simplify the manufacturing process thereof.

Therefore, by the setting of the conductive paste of the present disclosure, the holes on the surface of the conductive polymer layer can be filled effectively, so as to increase the flatness of the surface of the conductive polymer layer, and clad effectively the conductive polymer layer to achieve the effect of the surface modification. Further, the risk of the leakage or the short circuit of the capacitor can also be reduced effectively. Moreover, by the special physical property of the conductive paste of the present disclosure, the impregnation times of the conductive layer can be reduced, and the efficiency of the manufacturing method of the capacitor element can be improved effectively.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A conductive paste, comprising:
   a conductive composite material powder obtained by grinding a conductive composite material in a solid state; and
   a resin mixed with the conductive composite material powder;
   wherein the conductive composite material powder has a first particle size and a second particle size, the first particle size is 48 μm to 100 μm, and the second particle size is 18 μm to 38 μm.

2. The conductive paste of claim 1, wherein the conductive composite material is a poly(3,4-ethylenedioxythiophene)-poly(styrenesulfonate) complex, a complex of a poly (3,4-ethylenedioxythiophene)-poly(styrenesulfonate) and an organic ionic plastic crystal, a complex of a poly(3,4-ethylenedioxythiophene)-poly(styrenesulfonate) and a reduced graphene oxide or a complex of a poly(3,4-ethylenedioxythiophene)-poly(styrenesulfonate) and a reduced graphene oxide with a nickel oxide.

3. The conductive paste of claim 1, wherein the resin is polyester, epoxy resin, vinyl ester, phenolic resin, poly (methyl methacrylate) or polyurethane.

4. The conductive paste of claim 1, wherein based on the conductive paste is 100 wt %, the conductive composite material powder is 15 wt % to 40 wt %.

5. The conductive paste of claim 1, wherein a thixotropic index of the conductive paste is 0.1 to 10.

6. A manufacturing method of a conductive paste, which is used to manufacture the conductive paste of claim 1, and the manufacturing method of the conductive paste comprising:
   performing a polymerization step, wherein a conductive polymer, an oxidizing agent and an inhibitor are mixed and chemically polymerized to form the conductive composite material;
   performing a grinding step, wherein the conductive composite material is grinded after drying to obtain the conductive composite material powder; and
   performing a glue compounding step, wherein the conductive composite material powder is mixed with the resin to obtain the conductive paste.

7. The manufacturing method of the conductive paste of claim 6, wherein a molar ratio of the conductive polymer and the oxidizing agent is 0.5:1 to 10:1.

8. The manufacturing method of the conductive paste of claim 6, wherein a molar ratio of the oxidizing agent and the inhibitor is 1:0.1 to 1:5.

9. The manufacturing method of the conductive paste of claim 6, wherein the conductive polymer is a heterocyclic compound, a benzene ring compound, an aromatic ring compound or an amine compound.

10. The manufacturing method of the conductive paste of claim 6, wherein the inhibitor is a ring aromatic organic compound, an amine or a polyol.

11. The manufacturing method of the conductive paste of claim 6, wherein the oxidizing agent is a metal salt, a p-toluenesulfonate iron, a p-toluenesulfonic acid, an alkali metal, an alkaline earth metal, a metal oxide, a hydrogen peroxide, a nitric acid or a peroxyorganic acid.

12. A capacitor element, comprising:
   a metal foil, wherein a surface of the metal foil has an oxide layer;
   a conductive layer connected to the oxide layer of the metal foil, and the conductive layer comprising:
      a conductive polymer layer polymerized on the oxide layer of the metal foil; and the conductive paste of claim 1 coated on a surface of the conductive polymer layer away from the oxide layer; and a silver glue layer connected to a surface of the conductive paste away from the conductive polymer layer.

13. A manufacturing method of a capacitor element, comprising:

providing a metal foil, wherein a surface of the metal foil has an oxide layer;

polymerizing a conductive polymer layer on the oxide layer of the metal foil;

connecting the conductive paste of claim 1 to a surface of the conductive polymer layer away from the oxide layer by a coating method; and connecting a silver glue layer to a surface of the conductive paste away from the conductive polymer layer.

\* \* \* \* \*